(12) United States Patent
Hikichi et al.

(10) Patent No.: US 6,934,443 B2
(45) Date of Patent: Aug. 23, 2005

(54) OPTICAL FIBER COUPLING SYSTEM

(75) Inventors: Naoko Hikichi, Osaka (JP); Fumitoshi Kobayashi, Osaka (JP); Kenichi Nakama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 147 days.

(21) Appl. No.: 10/278,820

(22) Filed: Oct. 24, 2002

(65) Prior Publication Data

US 2003/0081899 A1 May 1, 2003

(30) Foreign Application Priority Data

Oct. 26, 2001 (JP) ..................................... P2001-328553

(51) Int. Cl.[7] .............................................. G02B 6/26
(52) U.S. Cl. ..................................................... 385/31
(58) Field of Search ............................. 385/31, 39, 43, 385/50–52, 115, 147, 97, 98, 123–127; 356/99–401, 505, 614, 615, 620, 621

(56) References Cited

U.S. PATENT DOCUMENTS

| | | | |
|---|---|---|---|
| 5,119,461 A | * 6/1992 | Beyer et al. | 385/147 |
| 5,200,024 A | 4/1993 | Blonder et al. | |
| 5,566,262 A | * 10/1996 | Yamane et al. | 385/33 |
| 5,812,723 A | * 9/1998 | Ohtsu et al. | 385/128 |
| 5,878,178 A | * 3/1999 | Wach | 385/55 |
| 6,058,232 A | * 5/2000 | Lee et al. | 385/39 |
| 6,144,791 A | * 11/2000 | Wach et al. | 385/123 |
| 6,522,817 B2 | * 2/2003 | Moran | 385/120 |
| 2003/0194186 A1 | * 10/2003 | Taylor et al. | 385/52 |

FOREIGN PATENT DOCUMENTS

| | | |
|---|---|---|
| EP | 0 752 601 | 1/1997 |
| JP | 2001-21775 | 1/2001 |

OTHER PUBLICATIONS

European Search Report dated Nov. 26, 2004.
XP 000570795 Smith et al. "Microlens Formation on Vad Single–Mode Fibre Ends" vol. 18 No. 2 pp. 407–409, Jan. 21, 1982.

* cited by examiner

Primary Examiner—Frank G. Font
Assistant Examiner—Christopher M. Kalivoda
(74) Attorney, Agent, or Firm—Whitham, Curtis & Christofferson, PC

(57) ABSTRACT

When an end surface of a silica optical fiber and another optical element are to be optically coupled to each other, according to the invention, the optical fiber is treated so that a core of the optical fiber is protruded from a clad of the optical fiber at an end portion of the optical fiber to form a protrusion shaped like a truncated cone or like a cone. On this occasion, the refractive index of the surrounding medium is selected to be in a range of from 1.35 to 1.60. Preferably, the area of the top surface of the truncated cone is not larger than ⅓ as large as the area of the bottom surface of the truncated cone. Further preferably, the side surface of the core protrusion is inclined at an angle of 30 degrees to 75 degrees, both inclusively, with respect to the central axis of the core.

10 Claims, 6 Drawing Sheets

OPTICAL FIBER COUPLING SYSTEM

BACKGROUND OF THE INVENTION

The present invention relates to an optical fiber coupling system for optically coupling an optical fiber and another optical element to each other in the field of optical communication and particularly to suppression of back reflection of light from an end surface of an optical fiber.

In the field of optical communication, light propagated through an optical fiber and light input/output to/from any kind of optical element such as a photodetector or a light source need to be coupled to each other. On this occasion, back reflection of light from an end surface of the optical fiber to the light source (semiconductor laser) side has large influence on stability of signal transmission. Hence, such back reflection needs to be suppressed to be extremely small.

The back reflectance BR is expressed by the ratio of the intensity $P_{BR}$ of back reflection of light to the intensity $P_{in}$ of incident light.

$$BR[dB]=10 \log(P_{BR}/P_{in})$$

When an ordinary silica optical fiber is cut by a fiber cutter or the like, the back reflectance BR of a flat end surface of the cut optical fiber is about −14 dB which is a very large value compared with the required value (−40 dB or smaller) in the field of optical communication. Therefore, methods such as a method having the steps of: obliquely polishing an end surface of an optical fiber; and forming an anti-reflection film on the end surface have been proposed as measures to reduce back reflection of light (e.g. Japanese Patent Laid-Open No. 2001-21775).

In various kinds of optical modules, means for filling an end surface of an optical fiber with a resin or the like to perform refractive index matching has been also used when an optical element and the optical fiber are coupled to each other. When light is incident from a medium with a refractive index $n_1$ onto a medium with a refractive index $n_2$ perpendicularly to the interface between these two media, the reflectance R is expressed by the following equation.

$$R=\{(n_1-n_2)/(n_1+n_2)\}^2$$

Hence, when light is emitted from a silica optical fiber having a core with a refractive index $n_1=1.46$ into air, such reflection occurs. Therefore, in most cases, the forward end of the optical fiber is generally bonded/fixed by a translucent resin with a refractive index substantially equal to 1.46 to be matched with the refractive index of the core of the silica optical fiber.

Productivity is however low because complicated steps are required for obliquely polishing the end surface of the optical fiber and forming the anti-reflection film on the end surface. Particularly in a multi-core tape fiber which has been used widely with the recent increase in communication capacity, there is a problem that it is difficult to produce the multi-core tape fiber.

On the other hand, it is said that the refractive index of the refractive index-matching resin changes from about 1.37 to about 1.58 when the temperature in use changes from −40° C. to +85° C. (as disclosed in Japanese Patent Laid-Open No. 2001-21775). The refractive index of the refractive index-matching resin depends extremely largely on the temperature. Generally, the refractive index of resin as well as the refractive index-matching resin has a temperature coefficient of about $10^{-3}$ °$C.^{-1}$. The temperature coefficient of the refractive index of silica is negligibly small compared with the temperature coefficient of the refractive index of resin. Hence, even in the case where the refractive index of the optical fiber and the refractive index of the resin are matched with each other at room temperature, there is a possibility that reflection may increase to be higher than a tolerance limit in the vicinity of the upper or lower limit of the temperature in use because of the refractive index difference caused by the change of the ambient temperature.

SUMMARY OF THE INVENTION

In order to solve the problems, an object of the invention is to provide a forward end shape of an optical fiber which can be formed by a simple process and by which the back reflectance can be reduced to a required level in optical communication.

When an end surface of a silica optical fiber and another optical element are to be optically coupled to each other, according to the invention, the optical fiber is treated so that a core of the optical fiber is protruded from a clad of the optical fiber at an end portion of the optical fiber to form a protrusion having a side surface which is inclined so as to be tapered toward a forward end and which is in contact with a surrounding medium.

Preferably, the refractive index of the surrounding medium on this occasion is selected to be in a range of from 1.35 to 1.60. Preferably, the forward end shape of the core at the end portion of the optical fiber is a truncated cone having its top area of not larger than ⅕ as large as its bottom area. The top area of the truncated cone may be substantially zero so that the forward end portion of the core can be regarded as being shaped like a cone.

Preferably, the vertical angle of the conical core protrusion at the end portion of the optical fiber is selected to be in a range of from 60 degrees to 150 degrees, both inclusively. Particularly preferably, the vertical angle of the conical core protrusion at the end portion of the optical fiber is selected to be in a range of from 60 degrees to 100 degrees, both inclusively.

When the optical fiber having such a forward end shape is used, low back reflectance (−40 dB to −60 dB) required in optical communication can be achieved. Particularly even in the case where the refractive index of the surrounding medium changes in the aforementioned range in accordance with the temperature change or the like, there is an effect that the back reflectance can be kept low.

In addition, such a forward end shape of the silica optical fiber can be formed only by wet etching using a hydrofluoric acid/ammonium fluoride etching solution. Hence, the production process can be simplified, so that productivity can be improved.

The present disclosure relates to the subject matter contained in Japanese patent application No. P2001-328553 (filed on Oct. 26, 2001), which is expressly incorporated herein by reference in its entirety.

DESCRIPTION OF THE PREFERRED EMBODIMENT

In the invention, a forward end shape of an optical fiber which can be formed without use of a process low in productivity such as an angular polishing process and which is hardly influenced by the change of the refractive index of the surrounding medium is found on the basis of the heretofore known fact that back reflection of light can be reduced by inclining an end surface of an optical fiber, particularly an end surface of a core portion from which light is emitted, with respect to the optical axis of the optical fiber.

The invention has a feature in that an optical fiber coupling system little in back reflection of light can be achieved simply by wet etching of an end portion of a single-mode optical fiber. Specifically, the optical fiber is treated so that a core end portion of the optical fiber is protruded from a clad portion of the optical fiber to form a protrusion shaped like a truncated cone or like a cone approximating to a shape in which the top portion of the truncated cone is reduced to be extremely small. In this manner, back reflection of light is reduced. The structure of the optical fiber end surface, particularly the structure of the core portion from which light is emitted, is formed so that a side surface of the protruded core is inclined symmetrically with respect to the optical axis of the optical fiber. By this structure, back reflection of light can be kept low even in the case where the refractive index of the surrounding medium varies.

A method for treating the end portion of the optical fiber will be described below.

Figure 1:
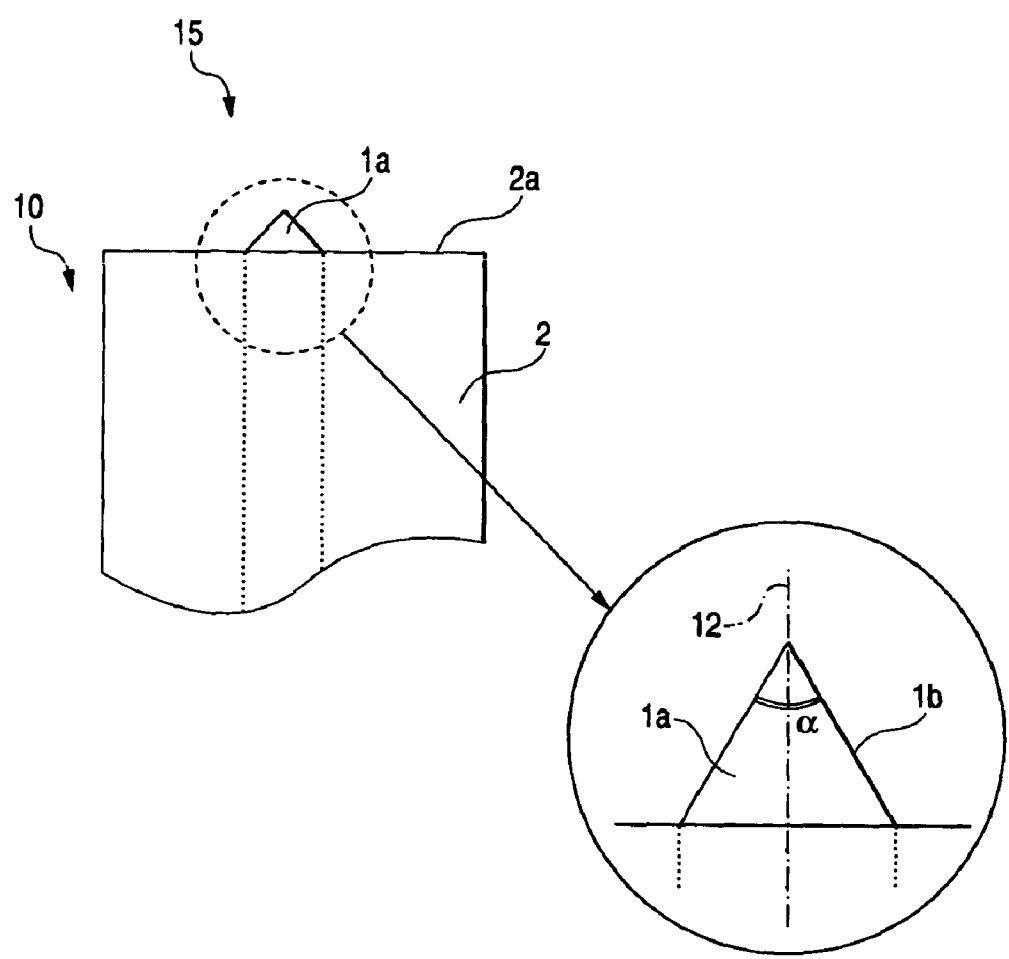
FIG. 1 is a side view of an end portion of an optical fiber in an embodiment of the invention.

A mixture solution of hydrofluoric acid and ammonium fluoride is used as the etching solution. As an example, a mixture solution obtained by mixing 4.5% by weight of hydrofluoric acid and 55% by weight of ammonium fluoride in 1:1 weight proportion is used as the etching solution. When an end surface of an ordinary silica single-mode optical fiber was etched for 2 hours while the temperature of the etching solution was kept at 50° C., a conical protrusion 1$a$ of a core 1 was formed as a portion protruded from an end surface 2$a$ of a clad 2 at an end portion 15 of an optical fiber 10, as shown in FIG. 1 which is a side view.

The height of the core protrusion 1$a$ from the clad end surface 2$a$ was about 3.5 $\mu$m. The vertical angle $\alpha$ of the cone shown in the enlarged view of the core protrusion 1$a$ was about 100 degrees. The vertical angle $\alpha$ of the cone can be controlled when the mixture proportion of hydrofluoric acid and ammonium fluoride and the temperature of the etching solution are changed. The vertical angle decreases as the amount of ammonium fluoride increases. The vertical angle increases as the temperature of the etching solution increases.

Figure 2:
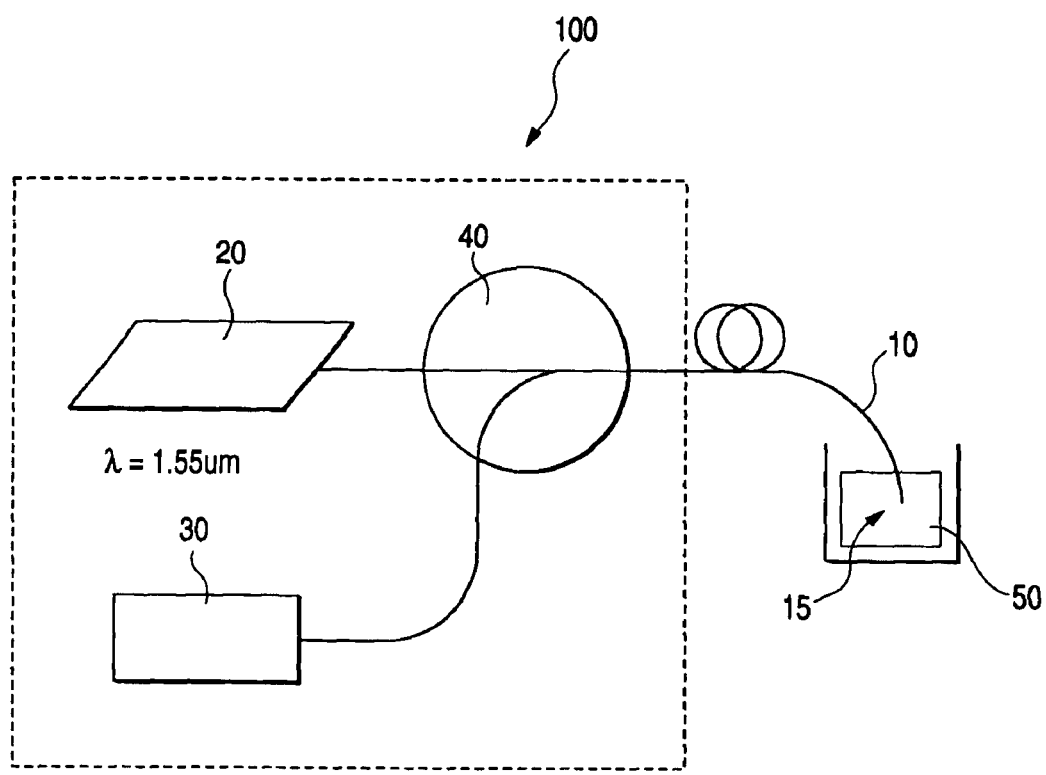
FIG. 2 is a schematic view showing a system for measuring the back reflectance.

The back reflectance was measured by a measuring system shown in FIG. 2. A back reflection meter 100 includes a semiconductor laser light source 20, and a power meter 30. The semiconductor laser light source 20 generates a measurement light beam at a wavelength of 1.55 $\mu$m. The power meter 30 is used for measuring back reflection of light. A light beam at a wavelength of 1.55 $\mu$m generated by the semiconductor laser light source 20 was propagated through the optical fiber 10 treated in the aforementioned manner. The optical fiber end surface 15 was immersed in each of standard refracting solutions 50 having refractive indices of 1.40, 1.46, 1.59 and 1.64. Light reflected by the optical fiber end surface 15 branched out into the power meter 30 by an optical circulator 40. The back reflectance was measured by the power meter 30. For comparison, the back reflectance was also measured in the case where the optical fiber end surface was placed in the air (n=1).

Figure 3:
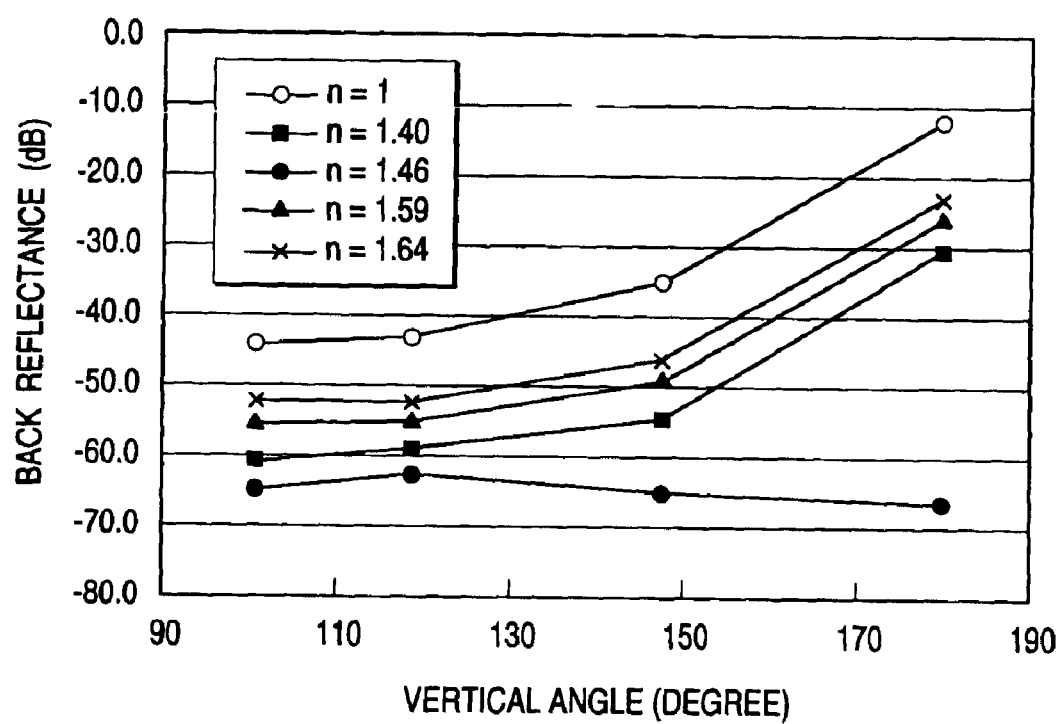
FIG. 3 is a graph showing results of measurement of the back reflectance in the embodiment of the invention.

Dependence of the back reflectance on the vertical angle of the cone is measured. Results of the measurement are as shown in FIG. 3. It is obvious that the back reflectance decreases as the vertical angle of the cone decreases. In addition, in any vertical angle, the back reflectance decreases as the refractive index of the surrounding medium approaches 1.46 which is the refractive index of the core of the silica optical fiber.

In consideration of application in the field of optical communication, the back reflectance required for transmitting a digital signal is not higher than −40 dB. It is obvious from FIG. 3 that the required back reflectance can be obtained if the vertical angle $\alpha$ is selected to be not higher than 150 degrees on the assumption that the refractive index of the surrounding medium is in a range of from 1.35 to 1.60.

Moreover, in order to obtain −60 dB which is the back reflectance sufficient to transmit an analog signal, the vertical angle $\alpha$ needs to be not higher than 100 degrees on the assumption that the refractive index of the surrounding medium is in the same range.

Incidentally, if the vertical angle is reduced by etching, the clad portion is also etched. As a result, sagging may occur in the clad end surface 2$a$ described as a flat surface perpendicular to the optical axis of the optical fiber 10 in FIG. 1. Moreover, the outer diameter of the clad 2 may be tapered off at a neighbor of the end portion of the optical fiber. Therefore, the smallest value of the vertical angle which can be produced by the aforementioned method and which can be used in practice is about 60 degrees.

That is, it can be said that the vertical angle of the conical core protrusion is preferably selected to be in a range of from 60 to 150 degrees, particularly in a range of from 60 to 100 degrees, if possible.

Incidentally, FIG. 1 shows the case where the end surface 2$a$ of the optical fiber is perpendicular to the optical axis 12 of the optical fiber. The optical fiber end surface cut by an optical fiber cutter or the like is, however, not always exactly perpendicular to the optical axis. In such a case, symmetry of the conical core protrusion 1$a$ with respect to the optical axis of the optical fiber as shown in FIG. 1 may be collapsed so that the conical core protrusion 1$a$ formed is inclined. Even in such a case, the preferred range of the vertical angle does not change.

Figure 4:
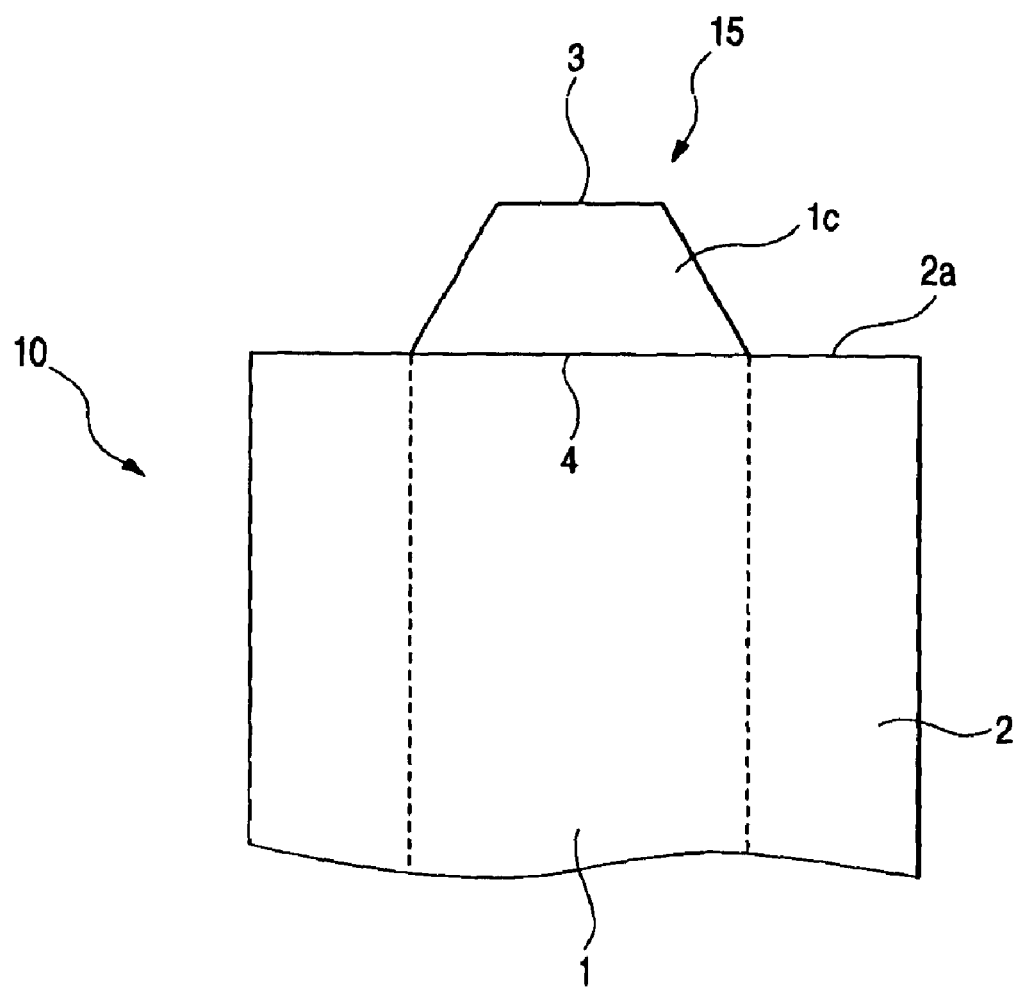
FIG. 4 is a side view of an end portion of an optical fiber in another embodiment of the invention.
Figure 5:
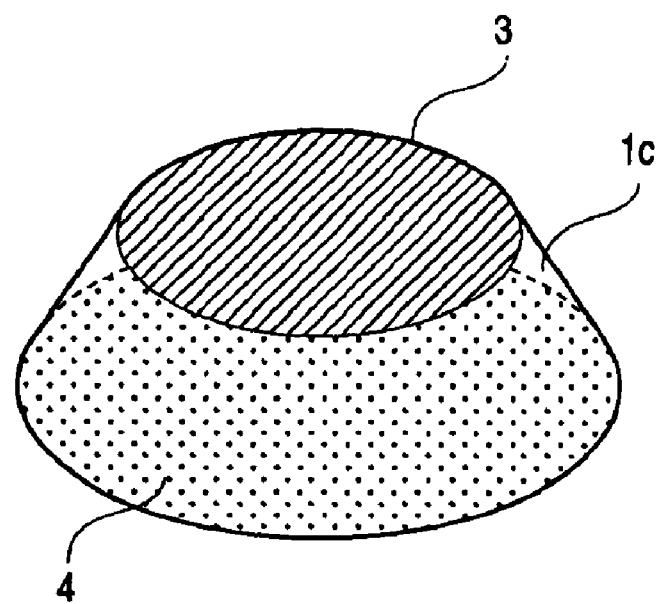
FIG. 5 is a perspective view of the end portion of the optical fiber in the embodiment of the invention.

If the etching time for the etching is shortened, the core end portion is shaped not like a cone but like a truncated cone in which a flat surface 3 remains in the top portion of the protrusion 1$a$ of the core 1 as shown in FIGS. 4 and 5 which are a side view and a perspective view respectively. As an example, when etching was performed for 2.5 hours by use of a 30° C. mixture solution obtained by mixing 4.5% by weight of hydrofluoric acid and 60% by weight of ammonium fluoride in 1:2 weight proportion, the area of the top flat surface 3 of the core protrusion 1$c$ was reduced to about ⅕ (20%) as large as the sectional area of the core before etching.

The area of the top flat surface 3 decreases as the etching time increases. Finally, the top flat surface 3 vanishes so that the truncated cone changes to a cone. Incidentally, the outer circumference of the bottom surface 4 of the truncated cone on the same plane with the clad end surface 2a substantially coincides with the diameter of the core 1 in the inside of the optical fiber. Hence, the area ratio is equivalent to the ratio of the area of the top surface of the formed truncated cone to the area of the bottom surface of the truncated cone.

Figure 6:
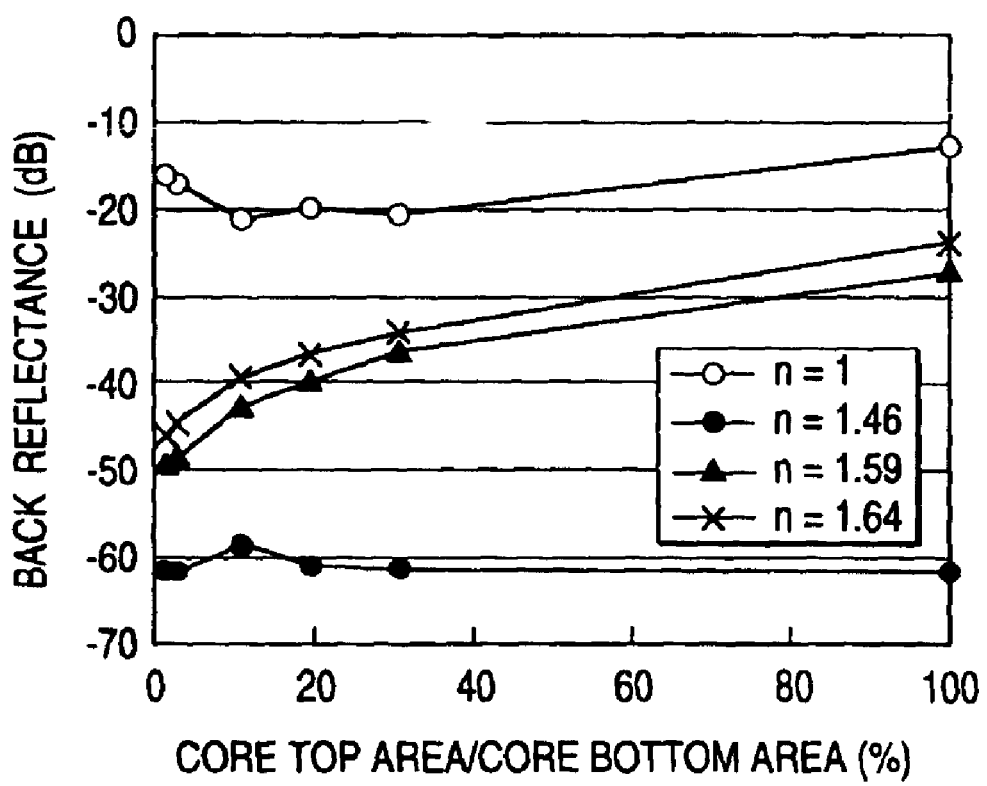
FIG. 6 is a graph showing results of measurement of the back reflectance in the embodiment of the invention.

A light beam at a wavelength of 1.55 μm was propagated through the optical fiber treated thus. An end surface of the optical fiber was immersed in each of standard refracting solutions having refractive indices of 1.40, 1.46, 1.59 and 1.64. For comparison, the end surface of the optical fiber was placed in the air (n=1). The back reflectance was measured in each of these conditions. Results of the measurement are as shown in FIG. 6. It is obvious that the back reflectance can be reduced as the area ratio decreases on the assumption that the refractive index of the surrounding medium approaches 1.46.

When the area of the top surface 3 of the truncated cone is not larger than 1/5 as large as the sectional area of the core before etching, the back reflectance of not higher than −40 dB can be obtained on the assumption that the refractive index of the surrounding medium is in a range of from 1.35 to 1.60. Although reflecting performance in the truncated cone is slightly inferior to that in the cone, the truncated cone has an advantage on process that the etching time can be shortened.

If the etching time is elongated to obtain a conical shape, it is inevitable that the clad portion near the end portion of the optical fiber is eroded to a certain degree. When the etching time is short, the clad diameter can be kept large sufficient to prevent the strength of the optical fiber from being lowered. Although description has been made upon the case where the forward end portion of the core is shaped like a truncated cone, it is not necessary that the top surface is always parallel with the bottom surface.

As described above, treatment of the optical fiber end surface in the invention is performed only by wet etching without necessity of obliquely polishing the end surface and forming an anti-reflection film on the end surface. Accordingly, the treatment process can be fundamentally performed likewise regardless of whether the optical fiber is a single-core optical fiber or a multi-core optical fiber (tape fiber). Hence, the invention is very effective for an optical fiber array which has a plurality of optical fibers arranged in parallel with one another and which required a long time when subjected to anti-reflection treatment in the related-art treatment method.

Moreover, when the forward end shape of the optical fiber according to the invention is formed, the back reflectance can be kept low even in the case where the refractive index of the surrounding medium is in a wide range. This means that the material of the surrounding medium can be selected in a wide range. Moreover, the forward end shape is effective against the refractive index change caused by the temperature change or the like.

In addition, the forward end of the optical fiber is treated so as to be shaped like a convex. Hence, if a concave portion is formed in an end surface of an optical element which is a partner to be coupled to the optical fiber, coupling alignment by fitting can be performed easily. As a result, there is also an advantage that coupling loss hardly increases even in the case where the optical axis of the optical fiber is inclined to the end surface of the partner optical element. This respect is also advantageous to coupling of an optical fiber array.

According to the invention, the back reflectance of light from an end surface of an optical fiber to a surrounding medium can be reduced greatly even in the case where the refractive index of the surrounding medium is in a wide range. Treatment of the optical fiber end surface to bring such an effect can be performed by a simple process such as wet etching. Hence, batch treatment can be performed easily on a multi-core tape fiber as well as on a single-core optical fiber.

What is claimed is:

1. An optical fiber coupling system for optically coupling an end surface of a silica-based optical fiber for communication and another optical element to each other with reduced back reflectance, comprising:
   a conical protrusion of a core portion of said optical fiber protruded from a clad portion of said optical fiber at an end portion of said optical fiber, said conical protrusion having a side surface inclined so as to be tapered toward a forward end, said side surface being in contact with a surrounding medium,
   wherein back reflectance in said silica-based optical fiber is reduced by
   said surrounding medium which is in contact with said side surface of said core portion at said end portion of said optical fiber having a refractive index of 1.35 to 1.60; and
   said forward end of said core portion at said end portion of said optical fiber being shaped like a truncated cone; and
   an area of a top surface of said truncated cone being not larger than 1/5 as large as an area of a bottom surface of said truncated cone.

2. An optical fiber coupling system according to claim 1, wherein the area of said top surface of said truncated cone is substantially zero, so that said forward end of said core portion is regarded as being shaped like a cone.

3. An optical fiber coupling system according to claim 1, wherein a vertical angle of said conical protrusion at said end portion of said optical fiber is in a range of from 60 degrees to 150 degrees, both inclusively.

4. An optical fiber coupling system according to claim 1, wherein a vertical angle of said conical protrusion at said end portion of said optical fiber is in a range of from 60 degrees to 100 degrees, both inclusively.

5. An optical fiber coupling system according to claim 1, wherein a plurality of optical fibers defined above are arranged in parallel with one another.

6. An optical fiber coupling system according to claim 1, wherein said surrounding medium includes matching resin.

7. An optical fiber coupling system according to claim 2, wherein a vertical angle of said conical protrusion at said end portion of said optical fiber is in a range of from 60 degrees to 150 degrees, both inclusively.

8. An optical fiber coupling system according to claim 2, wherein a vertical angle of said conical protrusion at said end portion of said optical fiber is in a range of from 60 degrees to 100 degrees, both inclusively.

9. An optical fiber coupling system according to claim 2, wherein a plurality of optical fibers defined above are arranged in parallel with one another.

10. An optical fiber coupling system according to claim 2, wherein said surrounding medium includes matching resin.

* * * * *